United States Patent [19]

Berquier et al.

[11] Patent Number: 5,071,709
[45] Date of Patent: Dec. 10, 1991

[54] GLAZING PROVIDED WITH AN ANTI-FROST LAYER

[75] Inventors: Jean-Marc Berquier, Clinchy; Dominique Ausserre, Le Mans; Liliane Leger, L'Hay-Les-Roses, all of France

[73] Assignee: Saint-Gobain Vitrage, Aubervilliers Cedex, France

[21] Appl. No.: 380,119

[22] Filed: Jul. 14, 1989

[30] Foreign Application Priority Data

Jul. 20, 1988 [FR] France .................. 88 09797

[51] Int. Cl.⁵ .............................. B32B 9/04
[52] U.S. Cl. .................... 428/447; 428/429
[58] Field of Search ............. 428/410, 429, 447, 426; 106/13

[56] References Cited

U.S. PATENT DOCUMENTS

| | | | |
|---|---|---|---|
| 4,263,350 | 4/1981 | Valimont | 428/429 |
| 4,847,160 | 7/1989 | Munz et al. | 428/447 |
| 4,927,668 | 5/1990 | Senckowski | 428/447 |

*Primary Examiner*—Merrell C. Cashion, Jr.
*Assistant Examiner*—Robert J. Follett
*Attorney, Agent, or Firm*—Oblon, Spivak, McClelland, Maier & Neustadt

[57] ABSTRACT

A glazing having a hydrophobic anti-frost surface formed from a composition of at least organosilane with a long aliphatic hydrocarbon chain which may or may not be saturated in a non-polar solvent system containing a non-polar hydrocarbon solvent and a small amount of a chlorinated solvent or a mixture of chlorinated solvents.

3 Claims, No Drawings

GLAZING PROVIDED WITH AN ANTI-FROST LAYER

BACKGROUND OF THE INVENTION

1. Field of the Invention

The present invention relates to an anti-frost glazing.

2. Description of the Background

The glazings which are used for transport or construction vehicles have a tendency to become covered with frost when the temperature is low. The removal of this layer of frost is difficult. For example, in the case of road transport vehicles, it is necessary to heat the cab of a vehicle while operating the vehicle. To do this electric resistance heating is incorporated in the glazings of the windows particularly the rear windows of vehicles. Defrosting by these means is always lengthy. A need therefore continues to exist for a rapid method of defrosting windows.

SUMMARY OF THE INVENTION

Accordingly, one object of the invention is to provide a glazing with an anti-frost layer which enables rapid removal of frost.

Another object of the present invention is to provide a method for forming such an anti-frost layer which adheres well to a glass support.

Briefly, these objects and other objects as hereinafter will become more readily apparent can be attained by a glazing having a hydrophobic anti-frost coating formed from a composition of at least one organosilane with a long aliphatic hydrocarbon chain which may or may not be saturated in a non-polar solvent system containing a non-polar hydrocarbon solvent and a small amount of a chlorinated solvent or a mixture of chlorinated solvents.

DETAILED DESCRIPTION OF THE PREFERRED EMBODIMENTS

The method by which the anti-frost layer of the invention is applied onto a glass support consists of (1) cleaning the glass surface to remove organic and mineral contaminants, (2) hydrating the cleaned surface, (3) immersing the glass support in the previously described organosilane composition, which composition is maintained under a dry atmosphere, at room temperature, with the immersion taking place while the composition is stirred by means of an ultrasonic generator, and (4) rinsing the layer obtained with a polar or aromatic solvent.

The composition used to form the anti-frost layer comprises an organosilane which preferably has an aliphatic hydrocarbon chain containing at least 11 carbon atoms. Preferred organosilanes include chlorosilanes and in particular trichlorosilanes, such as for example, 10-undecenyltrichlorosilane, 13-tetradecenyltrichlorosilane, 14-pentadecenyltrichlorosilane, 15-hexadecenyltrichlorosilane, n-hexadecyltrichlorosilane and n-octadecyltrichlorosilane. The organosilane compound is present in the composition at a concentration of $2 \times 10^{-3}$ to $5 \times 10^{-2}$ M.

The non-polar solvent system employed in the composition contains a conventional hydrocarbon solvent of the likes of n-hexadecane or isooctane. The non-polar solvent can be combined with polar solvents which are then used in a small amount, for example, chlorinated solvents used alone or in a mixture, such as dichloromethane, trichloromethane, trichloroethane, trichloroethylene, trichlorotrifluoroethane and carbon tetrachloride. The solvent system generally contains at least 80% by volume of non-polar solvent. When they are used, the chlorinated solvents represent 20% or less of the solvent system. When a mixture of chlorinated solvents is used with the non-polar solvent, they are used in various proportionate amounts to each other. Thus, for example, a mixture of carbon tetrachloride (12%) and chloroform (8%), trichlorotrifluoroethane (10%) and trichloroethane (10%) may be used.

Before applying the organosilane composition onto a glass support to obtain an anti-frost layer, the surface of the glass to be coated is cleaned in order to remove all organic and mineral contaminants, thus rendering it perfectly wettable. For this purpose, any suitable treatment can be used. For example, the glass surface may be cleaned with a solvent or a mixture of conventional solvents, possibly while being subjected to ultrasonic vibration. The surface can also be treated with a detergent solution, such as a solution of "Liquinox" (from Aldrich), of "Deconex 12" (Borer Chemie), and then possibly with a polar solvent such as chloroform. The glass surface can also be cleaned with solvents and/or detergent solutions, then treated with ozone by exposing the surface to ultraviolet light under an oxygen atmosphere. The glass surface can also be treated using any other appropriate method, for example, by depositing an intermediate layer on it so as to improve the adhesion of the anti-frost layer.

Before layering the organosilane composition on the cleaned glass surface, the surface is rehydrated by exposing it, for example, for a few seconds to a moist atmosphere. The glazing is then placed in the organosilane solution, under a dry atmosphere, preferably under a dry nitrogen atmosphere and at room temperature of 16°–24° C. The immersion is carried out while the solution is stirred by an ultrasonic generator. The length of the treatment is on the order of a few minutes, for example, from 1 minute to 10 minutes. It is then rinsed with a polar or an aromatic solvent such as trichloroethane, trichloromethane or toluene, possibly while being exposed to ultrasonic vibration, to ensure the stability of the formed layers.

The deposit of the anti-frost layer is considered complete when the glass surface bearing said layer appears dry, very rapidly, upon exiting the solution.

It is important for the deposit of the hydrophobic layer on the surface of the glass to be carried out under the conditions indicated. In particular, the composition contains organosilane in a non-polar solvent system which particularly promotes the grafting of the silane onto the surface of the glass.

In addition, the treatment takes place under a dry atmosphere, particularly under a dry nitrogen atmosphere, because the organosilanes are very sensitive to traces of humidity and have a tendency to polymerize in the presence of water, which results in layers which are grafted irregularly.

The temperature is an important factor. Room temperature ranging from 16°–24° C. enables the grafting rate of the silanes (approximately 60% measured using FTIR) to be increased. A higher temperature, on the order of 30°–40° C., is also possible if a lower grafting is desired.

It has been noticed that the treatment in the presence of stirring obtained using an ultrasonic generator provides better homogeneousness of the layer, preventing the formation of surface aggregates.

The layer obtained is an ordered monolayer with polysiloxane motifs, in which the organosilanes are grafted evenly. It is thought that the structure is the following:

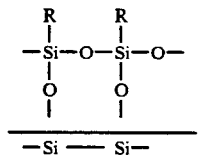

where R is the long aliphatic hydrocarbon chain.

The layers obtained provide the glass support with uniform anti-frost properties over its entire surface.

To determine the hydrophobic character of the layer obtained, the an9le of contact which the edge of a drop of water makes with the layer deposited on the 9lass surface is measured. The treated glass surface is considered to have an anti-frost character when the angle of contact is greater than 80°, and preferably equal to or greater than 100°.

The determine the anti-frost action of the deposited layer, the coated glazings are placed in a damp atmosphere at −20° C. The surfaces become covered with frost. For the layers to have a satisfactory anti-frost character, the layer of frost must become detached or deteriorate with simple finger pressure or a very light wiping on the frost, in the absence of any heating.

Having now generally described this invention, a further understanding can be obtained by reference to certain specific examples which are provided herein for purposes of illustration only and are not intended to be limiting unless otherwise specified.

EXAMPLE 1

A sheet of silico-soda lime glass obtained by the "floated" glass manufacturing technique was used as a support.

The surface of the sheet of glass which was to be coated with the anti-frost layer was cleaned. For this purpose, an aqueous solution with 1% "Liquinox" (Aldrich) detergent was used. The sheet was left to soak in this solution for approximately one hour. The sheet was rinsed with water and then with alcohol. It was dried under a flow of nitrogen. The sheet cleaned in this manner was left in ambient air, sheltered from dust, for 30 to 60 seconds. The sheet was then immersed for one minute in trichloroethane while being subjected to ultrasonic vibration.

A solution was prepared containing n-octadecyltrichlorosilane (OTS) in a concentration of $4 \times 10^{-3}$ M in a non-polar solvent mixture containing 80% by volume of n-hexadecane, 12% carbon tetrachloride and 8% chloroform. The sheet of glass was placed into this solution, at room temperature of 22° C., under a dry nitrogen atmosphere, with the solution being stirred by means of an ultrasonic generator. The sheet was left in the solution for 4 minutes. The sheet was rinsed with trichloroethane while being exposed to ultrasonic waves.

The angle of contact of a drop of water on the coated layer was 101°.

The sheet was placed in a damp atmosphere at −20° C. The surfaces of the sheet became covered with frost A single very light wiping of the surfaces of sheets treated by the method described and having a frost covering thereon was all that was necessary to remove the frost covering.

EXAMPLE 2

The method of Example 1 was repeated except that for cleaning the sheet of glass before depositing the anti-frost layer, a toluene bath was used which was stored by means of an ultrasonic generator. To remove any organic contaminant, the glass surface was then subjected to ozone by exposing it for 30 minutes to ultraviolet light under an oxygen atmosphere.

The ozonated surface was left in ambient air for a few seconds, sheltered from dust, and then an anti-frost layer was deposited thereon from the silane solution described in Example 1. The angle of contact of a drop of water on this layer was 110°.

The frosting test showed that this layer has very good anti-frost properties. The layer of frost was removed at −20° C. and was very easily removed with simple finger pressure.

EXAMPLE 3

The method of Example 1 was repeated except that the anti-frost layer was formed from a solution containing 0.2 ml of OTS in 100 ml of a non-polar solvent system containing 80% by weight of isooctane, 10% trichlorotrifluoroethane and 10% trichloroethane. The coated sheet was rinsed with trichloroethane for 10 minutes while being subjected to ultrasonic vibration.

The angle of contact of a drop of water on this layer was 106°.

A layer of frost was formed at −20° C., as indicated previously. The frost layer was easily removed by simple rubbing of the finger on the layer of frost.

EXAMPLE 4

The method of Example 1 was repeated except that the layer was not treated with ozone. In addition, the glass surface was not submitted to ambient air after its cleansing. To the contrary, the sheet was placed in a drying oven for 1 hour at 120° C. It was left to cool in a dry atmosphere.

After the deposit of the silane solution as in Example 1, the angle of contact of a drop of water on the layer obtained was 80°.

Frost formed at −20° C. was difficult to remove.

The following table, which summarizes the examples, shows that depending on the conditions of the deposit of the anti-frost layer, the layer obtained gives better or worse results.

| Ex. | Cleaning Solvent and/or solution of detergent | Ozone | Air | Angle of contact | Defrosting |
|---|---|---|---|---|---|
| 1 | yes | no | yes | 101° | Good |
| 2 | yes | yes | yes | 110° | Good |
| 3 | yes | no | yes | 106° | Good |
| 4 | yes | no | no | 80° | Passable |

In particular, the table shows that the best results are obtained by depositing a layer of organosilane composition, after extensive cleaning of the glass support followed by treatment with ozone and then rehydration of the ozonated surface.

Having now fully described the invention, it will be apparent to one of ordinary skill in the art that many changes and modifications can be made thereto without departing from the spirit or scope of the invention as set forth herein.

What is claimed as new and desired to be secured by Letters Patent of the United States is:

1. A glazing having an anti-frost, hydrophobic layer thereon, prepared by a process comprising:
treating the surface of a glazing with a composition containing from $2 \times 10^{-3}$ to $5 \times 10^{-2}$M of at least one chloroorganosilane having a long, saturated or unsaturated aliphatic hydrocarbon chain of at least eleven carbon atoms in a non-polar solvent system containing at least 80% by volume of a non-polar hydrocarbon solvent and 20% or less of a chlorinated solvent or a mixture of chlorinated solvents, thereby forming said anti-frost surface on said glazing.

2. The glazing of claim 1, wherein the organosilane is selected from the group consisting of 10-undecenyltrichlorosilane, 13-tetradecenyltrichlorosilane, 14-pentadecenyltrichlorosilane, 15-hexadecenyltrichlorosilane, n-octadecyltrichlorosilane and n-hexadecyltrichlorosilane.

3. The glazing of claim 1, wherein the hydrocarbon non-polar solvent is n-hexadecane or isooctane and the chlorinated solvent is selected from the group consisting of dichloromethane, trichloromethane, trichloroethane, trichloroethylene, trichlorotrifluoroethane and carbon tetrachloride.

* * * * *